(12) United States Patent
Lei et al.

(10) Patent No.: US 6,850,741 B2
(45) Date of Patent: Feb. 1, 2005

(54) METHOD FOR SELECTING SWITCHED ORTHOGONAL BEAMS FOR DOWNLINK DIVERSITY TRANSMISSION

(75) Inventors: Zhongding Lei, Singapore (SG); Po Shin Francois Chin, Singapore (SG); Ying Chang Liang, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 432 days.

(21) Appl. No.: 10/116,240

(22) Filed: Apr. 4, 2002

(65) Prior Publication Data

US 2003/0190897 A1 Oct. 9, 2003

(51) Int. Cl.[7] .................................................. A04B 1/02
(52) U.S. Cl. .................. 455/101; 455/63.4; 455/562.1; 342/359; 342/367
(58) Field of Search .............................. 455/562.1, 101, 455/91, 561, 25, 13.3, 15, 19, 7, 63.4, 82, 272–279.1; 342/399, 174, 767, 354, 350; 343/18

(56) References Cited

U.S. PATENT DOCUMENTS

| | | | | |
|---|---|---|---|---|
| 6,104,935 | A * | 8/2000 | Smith et al. .............. | 455/562.1 |
| 6,580,701 | B1 * | 6/2003 | Ylitalo et al. ................ | 370/334 |
| 2003/0032453 | A1 * | 2/2003 | Katz et al. .................. | 455/562 |
| 2003/0151553 | A1 * | 8/2003 | Ylitalo ........................ | 342/422 |
| 2004/0014432 | A1 * | 1/2004 | Boyle .......................... | 455/101 |

OTHER PUBLICATIONS

A. Wittneben, *A New Bandwidth Efficient Transmitting Antenna Modulation Diversity Scheme For Linear Digital Modulation*, Proceeding of the 1993 IEEE International Conference on Communications (ICC'93), pp. 1630–1634, May 1993.

N. Seshadri and J. H. Winters, *Two Signaling Schemes For Improving The Error Performance Of Frequency–Division–Duplex (FDD) Transmission Systems Using Transmitting Antenna Diversity*, International Journal of Wireless Information Networks, vol. 1, No. 1, 1994.

V. Tarokh, N. Seshadri and A. R. Calderbank, *Space–Time Codes For High Data Rate Wireless Communications: Performance Analysis And Code Construction*, IEEE trans. on Information Theory, vol. 44, No. 2, pp. 744–765, Mar. 1998.

R. Negi, A. M. Tehrani and J. Cioffi, *Adaptive Antennas For Space–Time Coding Over Block Invariant Multipath Fading Channels*, Proc. of IEEE 49th VTC, vol. 1, pp. 70–74, 1999.

S. M. Alamouti, *A Simple Diversity Transmission Technique For Wireless Communications*, IEEE Journal of Selected Areas in Communications, vol. 16, No. 8, pp. 1451–1458, Oct. 1998.

V. Tarokh, N. Seshadri and A. R. Calderbank, *Space–Time Block Codes From Orthogonal Designs*, IEEE Trans. on Information Theory, vol. 45, No. 5, pp. 1456–1467, Jul. 1999.

* cited by examiner

Primary Examiner—Pablo N. Tran
(74) Attorney, Agent, or Firm—Conley Rose, P.C.

(57) ABSTRACT

A scheme for selecting two beams in a switched beam antenna system for providing downlink communications in a downlink channel, the switched beam antenna system providing uplink reception and downlink transmission is described. The scheme involves selecting a pair of beams based on the uplink reception of the switched beam antenna system, and determining from the pair of beams a corresponding pair of orthogonal beams. The scheme also involves providing the pair of orthogonal beams as a pair of transmit beams for the downlink transmission of the switched beam antenna system.

20 Claims, 13 Drawing Sheets

METHOD FOR SELECTING SWITCHED ORTHOGONAL BEAMS FOR DOWNLINK DIVERSITY TRANSMISSION

FIELD OF INVENTION

The invention relates in general to wireless communication systems. More particularly, it relates to a system for improving the downlink transmission performance of wireless communication systems.

BACKGROUND

Wireless communications may suffer from four major impairments, namely path loss, multipath fading, inter-symbol interference and co-channel interference. Adaptive antenna systems may be used to suppress the effects of such impairments to improve the performance of wireless communication systems. There are two types of adaptive antenna systems, namely diversity antenna systems and beamforming antenna systems. In a diversity antenna system, multiple low-correlation or independent fading channels are utilised in order to compensate multipath fading, thus achieving diversity gain. Beamforming antenna systems, on the other hand, achieve beamforming gain by applying spatial directivity, thus limitedly compensating for path loss and suppressing co-channel interference.

In a diversity antenna system, antenna spacing is usually required to be sufficiently large, for example 10λ, in order to achieve low-correlation or independent fading channels. This is especially true for small angular spread environments. However, a beamforming antenna system need to achieve spatial directivity, so signals received at and/or transmitted from all beamforming antennas must be correlated. This means that for a beamforming antenna system, antenna spacing is usually small, for example half wavelength for a uniform linear array (ULA). Because of the conflict between the required antenna spacing for diversity and beamforming antenna systems, there exists a technical prejudice among those skilled in the art that diversity and beamforming gains cannot be achieved simultaneously.

A classical approach to achieving antenna diversity is to use multiple antennas at the receiver and perform combining or selection to improve the quality of the received signal.

The major problems faced with using the receiving antenna diversity or diversity reception approach in the downlink of wireless communication systems relate to constraints in cost, size and power consumption of the receiver. For apparent reasons, features such as small size, lightweight and low cost are paramount considerations in designing wireless communications receivers. The addition of multiple antennas and radio frequency (RF) chains or selection and switching circuits in such receivers is presently not feasible. Consequently, diversity reception techniques are often applied only to improve the uplink transmission quality by the use of multiple antennas at the base station. Since a base station often serves thousands of receivers, it is more economical to add equipment to the base station rather than the receivers.

Other approaches relating to transmitting antenna diversity or diversity transmission have also been suggested, for instance, a delay diversity scheme is proposed by A. Wittneben in "A new bandwidth efficient transmitting antenna modulation diversity scheme for linear digital modulation", Proceeding of the 1993 IEEE International Conference on Communications (ICC'93), pp. 1630–1634, May 1993. This proposal relates to a base station transmitting a sequence of symbols through one antenna and the same but delayed sequence of symbols through another antenna. A special case of this scheme was proposed by N. Seshadri and J. H. Winters in "Two signaling schemes for improving the error performance of frequency-division-duplex (FDD) transmission systems using transmitting antenna diversity", International Journal of Wireless Information Networks, Vol. 1, No. 1, 1994. The sequence of codes in this scheme is routed through a cycling switch that directs each code to various antennas in succession. Since copies of the same symbols are transmitted through multiple antennas at different times, both space and time diversities are achieved.

A coding technique known as space-time trellis coding (STTC) has been proposed by V.Tarokh, N. Seshadri and A. R. Calderbank in "Space-time codes for high data rate wireless communication: Performance analysis and code construction", IEEE trans. on Information Theory, vol. 44, No. 3, pp. 744–765, March 1998. The STTC technique combines signal processing at the receiver with coding techniques appropriate to multiple transmitting antennas, and provides significant gain over aforementioned approaches. Specific space-time trellis codes designed for two to four transmitting antennas perform well in slow fading environments, which is typical of indoor transmission, and come within 2–3 dB of the theoretical outage capacity. The bandwidth efficiency achieved is about three to four times of other systems. The space-time trellis codes proposed provide the best possible trade-off between constellation size, data rate, diversity advantage, and trellis complexity. However, when the number of transmitting antennas is fixed, the decoding complexity of the STTC technique, as measured by the number of trellis states at the decoder, increases exponentially as a function of both diversity level and transmission rate.

In attempting to further improve downlink performance where the STTC technique is employed, a scheme to combine a beamforming technique with space-time trellis coding is proposed by R. Negi, A. M. Tehrani and J. Cioffi in "Adaptive antennas for space-time coding over block invariant multipath fading channels", Proc. of IEEE VTC, pp. 70–74, 1999. In the proposal, an optimum beamformer is derived based on the coding criteria given in the proposal by V. Tarokh et al to achieve diversity gain as well as beamforming gain. This scheme achieves diversity gain and beamforming gain simultaneously for wireless communication systems employing the STTC technique. For a given achievable diversity gain, optimal transmission beamforming weights to maximize beamforming gain are found via singular-value decomposition (SVD) based on coding techniques.

For addressing the issue of decoding complexity of the STTC technique, S. M. Alamouti proposes a scheme for transmission using two antennas in "A simple diversity transmission technique for wireless communications", IEEE Journal of Selected Areas in Communications, Vol. 16, No.8, pp.1451–1458, October 1998. This involves a maximum likelihood detection scheme based only on linear processing at the receiver. A space-time block coding (STBC) technique introduced by V. Tarokh, N. Seshadri, and A. R. Calderbank in "Space-time block codes from orthogonal designs," IEEE Trans. On Information Theory, Vol. 45, pp. 1456–1467, July 1999, generalizes this transmission scheme to an arbitrary number of transmitting antennas and is able to achieve the full diversity promised by the transmitting and receiving antennas. Unfortunately, higher order complex orthogonal block codes all have less than unity coding rate, which results in a reduction in data throughput or an expansion in bandwidth in order to maintain the same date rate. Furthermore, it is not clear whether using higher order diversity transmission directly or applying other error correction codes on top of the second order diversity transmission system achieves better overall performance. Therefore, the two-antenna STBC scheme proposed by Alamouti remains one of the most attractive schemes for its simplicity and unity coding-rate.

FIG. 1 is a block diagram of a wireless communication system for illustrating Alamouti's proposed diversity scheme using two transmitting antennas 102 equipped at a base station (BS) 104 for achieving diversity transmission. A signal s(n) to be transmitted is first coded in a space-time block coding module 106 in the base station 104 which has one input port 108 and two output ports 110. The input port 108 accepts the transmitted sequence, s(0), s(1), . . . s(n) and the two output ports 110 provide, in response, respective output signals $s_1(t)$ and $s_2(t)$ at time instants t=n and t=n+1 as follows:

|        | t = n        | t = n + 1       |
|--------|--------------|-----------------|
| $s_1(t)$ | $s(n)/\sqrt{2}$ | $s^*(n+1)/\sqrt{2}$ |
| $s_2(t)$ | $s(n+1)/\sqrt{2}$ | $-s^*(n)/\sqrt{2}$  | where n is an even integer and '*' denotes a complex conjugate operation.

At a single receiving antenna 112 at a mobile terminal 114, signals received at time instants t=n and t=n+1 are given by:

$$x(n)=\alpha_1 s_1(n)+\alpha_2 s_2(n)+v(n) \quad (1)$$

$$x(n+1)=\alpha_1 s_1(n+1)+\alpha_2 s_2(n+1)+v(n+1) \quad (2)$$

where $\alpha_1$ and $\alpha_2$ are the respective channel coefficients 116 from the two transmitting antennas 102 to the receiving antenna 112, respectively, and v(n) is the additive white Gaussian noise (AWGN).

The received signal is subsequently decoded by a space-time decoding module 118 in the mobile terminal 114. Specifically, equations (1) and (2) may be written in matrix forms:

$$\begin{bmatrix} x(n) \\ x(n+1) \end{bmatrix} = \frac{1}{\sqrt{2}} \begin{bmatrix} s(n) & s(n+1) \\ s^*(n+1) & -s^*(n) \end{bmatrix} \begin{bmatrix} \alpha_1 \\ \alpha_2 \end{bmatrix} + \begin{bmatrix} v(n) \\ v(n+1) \end{bmatrix} \quad (3)$$

$$\begin{bmatrix} x(n) \\ x^*(n+1) \end{bmatrix} = \frac{1}{\sqrt{2}} \begin{bmatrix} \alpha_1 & \alpha_2 \\ -\alpha_2^* & \alpha_1^* \end{bmatrix} \begin{bmatrix} s(n) \\ s(n+1) \end{bmatrix} + \begin{bmatrix} v(n) \\ v^*(n+1) \end{bmatrix} \quad (4)$$

Therefore, channel coefficients 116 may be estimated via equation (3) using training symbols, while equation (4) may be used for signal estimation/detection. In such a scheme proposed by Alamouti, channel coefficient estimation and signal detection involve very simple linear operations. Also, compared to a diversity reception technique involving one transmitting antenna and two receiving antennas, the scheme achieves the same order of diversity gain as diversity reception techniques using a maximum ratio combining (MRC) approach, although the scheme suffers from a 3 dB performance loss.

To achieve diversity gain and beamforming gain simultaneously for systems employing the STBC technique, it is apparent that the transmission structure adopted by STTC systems to achieve the both gains can be employed similarly. But it is not very clear for STBC systems how much these two kinds of gain can be obtained and how to determine beamforming weights. Therefore a method to obtain the optimal beamforming weights, in terms of obtaining fall diversity as well as maximizing output signal-to-noise ratio, is derived in hereinafter from a signal processing point of view.

FIG. 2 shows a system employing the STBC technique, which combines beamforming technique with diversity transmission. A signal to be transmitted, s(n), is first provided to an input 202 of a space-time block encoder 204 and coded by it yielding two branch outputs 206 as $s_1(n)$ and $s_2(n)$. The output signals are then passed into two transmit beamformers $w_1$ 208 and $w_2$ 210 for beamforming processing, and passed on to a signal combiner 212 which performs a simple summing function of the two beamforming processed inputs to produce a vector signal x(n) 214 for transmission through multiple antennas 216. The signal x(n) 214 may be expressed as:

$$x(n) = w_1^H s_1(n) + w_2^H s_2(n) \quad (5)$$

The physical channel is assumed to consist of L spatially separated paths, of which fading coefficients and directions of arrival (DOAs) are denoted as $(\alpha_l(t),\theta_l)$ for l=1,Λ,L. If the maximum time delay relative to the first arrived path is smaller than the symbol interval, a flat fading channel is observed, and the instantaneous channel response 218 may be expressed as:

$$h(t) = \sum_{l=1}^{L} \alpha_l(t) \cdot a(\theta_l) \quad (6)$$

where $a(\theta_l)$ is the downlink steering vector at DOA $\theta_l$. The signal y(n) arriving at a receiving antenna 220 at a mobile terminal 222 is given by:

$$y(n) = w_1^H \cdot h(t) \cdot s_1(n) + w_2^H \cdot h(t) \cdot s_2(n) + v(n) \quad (7)$$

By denoting $$\beta_1(t) = w_1^H \cdot h(t) \text{ and } \beta_2(t) = w_2^H \cdot h(t),$$

transmission beamforming weights may be estimated by maximizing the cost function:

$$J=E[|\beta_1(t)|^2+|\beta_2(t)|^2] \quad (8)$$

$$\text{s.t. } E[\beta_1(t)\cdot\beta_2^*(t)]=0 \quad (9)$$

and $$w_1^H \cdot w_1 + w_2^H \cdot w_2 = 1 \quad (10)$$

where 'E' denotes the expectation operation. Maximum SNR is obtained by maximizing (8) subject to (10), while condition (9) guarantees that $\beta_1(t)$ and $\beta_2(t)$ are statistically uncorrelated thus achieving full diversity gain.

Comparing (1) with (7), with the aid of downlink beamforming, two statistical uncorrelated fading channels, $\beta_1(t)$ and $\beta_2(t)$ have been artificially generated, with which space-time block decoding may be used to recover the transmitted signal s(n).

The optimal transmission beamforming weight vectors are Eigenvectors corresponding to the two largest Eigenvalues of the downlink channel covariance matrix:

$$R = E[h(t) \cdot h^H(t)] \quad (11)$$

where the expectation is conducted over all fading coefficients. Suppose the average power of each path is $E|\alpha_l(t)|^2 = \gamma_l$, the covariance matrix is given by:

$$R = \sum_{l=1}^{L} \gamma_l \cdot a(\theta_l) \cdot a^H(\theta_l) \quad (12)$$

To achieve full diversity and maximized beamforming, this scheme requires only up to second order statistics of fading channel. Whereas the scheme involving the combining of the STTC technique with beamforming, beamforming weights are guaranteed to be optimal for Rayleigh/Rice fading channel only.

The aforementioned schemes for systems employing either the STTC or STBC technique achieve diversity gain and optimal beamforming gain via combining the space-time coding techniques with the adaptive beamforming technique. The optimal beamforming weights may be obtained through either SVD or Eigen-decomposition. However, theoretical performance benefits achieved by the adaptive systems may be offset by the cost and complexities encountered in implementation. In wireless communications environments, received complex envelopes of signals vary rapidly due to fading. The adaptive beamformer must therefore "track" the change in the fading envelope so that beamforming weights always meet the optimality requirements. If the tracking performance using the adaptive algorithm is not sufficient, beamforming performances may degrade.

For the beamforming technique, one simple alternative to the adaptive antenna system is the switched beam antenna system. The switched beam antenna system consists of multiple narrow beams, of which the beam considered best or has the strongest received power is used to serve a desired mobile terminal as it is moved through the coverage of a base station. The switched beam antenna system is more economical to implement, requiring only a static beamforming network, RF switch and control. Commercial deployments of switched beam antenna systems have demonstrated significant performance improvements over systems without multiple antennas. Nevertheless, the performance of the switched beam antenna system is considered by those skilled in the art to be inferior to that of the adaptive antenna system. Hence, because of the trade-off between implementation complexity and system performance, there is a technical prejudice that directly combining a switched beam antenna system with a space-time coding technique sacrifices system performance for the complexity of implementation.

Therefore, there is a need for a system that provides the performance of an adaptive antenna system while possessing the implementation simplicity of a switched beam system for achieving diversity gain and beamforming gain simultaneously.

SUMMARY

In accordance with a first aspect of the invention, there is disclosed a method for selecting two beams in a switched beam antenna system for providing downlink communications in a downlink channel, the switched beam antenna system providing uplink reception and downlink transmission. The method comprises the steps of selecting a pair of beams based on the uplink reception of the switched beam antenna system, and determining from the pair of beams a corresponding pair of orthogonal beams. The method further comprises the step of providing the pair of orthogonal beams as a pair of transmit beams for the downlink transmission of the switched beam antenna system.

In accordance with a second aspect of the invention, there is disclosed a switched beam antenna system for selecting two beams for providing downlink communications in a downlink channel, the switched beam antenna system further providing uplink reception and downlink transmission. The system comprises means for selecting a pair of beams based on the uplink reception of the switched beam antenna system, and means for determining from the pair of beams a corresponding pair of orthogonal beams. The system further comprises means for providing the pair of orthogonal beams as a pair of transmit beams for the downlink transmission of the switched beam antenna system.

BRIEF DESCRIPTION OF DRAWINGS

Embodiments of the invention are described hereinafter with reference to drawings, in which.

DETAILED DESCRIPTION

A system according to an embodiment of the invention is disclosed hereinafter to address the need for a system that provides the performance of an adaptive antenna system while possessing the implementation simplicity of a switched beam system for achieving diversity gain and beamforming gain simultaneously Such a system involves a practical, inexpensive, and robust downlink transmission scheme for achieving both diversity and beamforming gain based on some simple uplink measurements. In particular, the system approximates the maximum beamforming gain and achieves full diversity transmission as well by combining the STBC technique with a switched beam antenna system. The switched beam antenna system preferably has the same simple physical structure as that employed for uplink in a base station.

The system involves a downlink diversity transmission scheme to combat fading effect for wireless communication systems where multiple antennas are employed in base stations while only a single antenna is employed in mobile terminals. A number of advantages are associated with such a system, which are described hereinafter.

Firstly, the system includes a low cost switched beam system, and thus is simple to implement and cost effective. And in such a system, diversity transmission is fully obtained. At the same time, the beamforming gain is maximized to an approximating optimum value that is conventionally achieved by complex adaptive antenna systems. Furthermore, the scheme used in the system is applicable to frequency-selective fading channel when employed in CDMA and OFDM systems. The scheme is also applicable to either TDD systems or FDD systems. Additionally, the system by achieving combined beamforming and diversity transmission provides high spectrum efficiency, yet consumes less transmission power. Lastly, since a mobile terminal is usually limited by physical size and battery power, the system allows complicated processing to be performed at a base station, rather at the mobile terminal, thus reducing the mobile terminal complexity.

Figure 2:
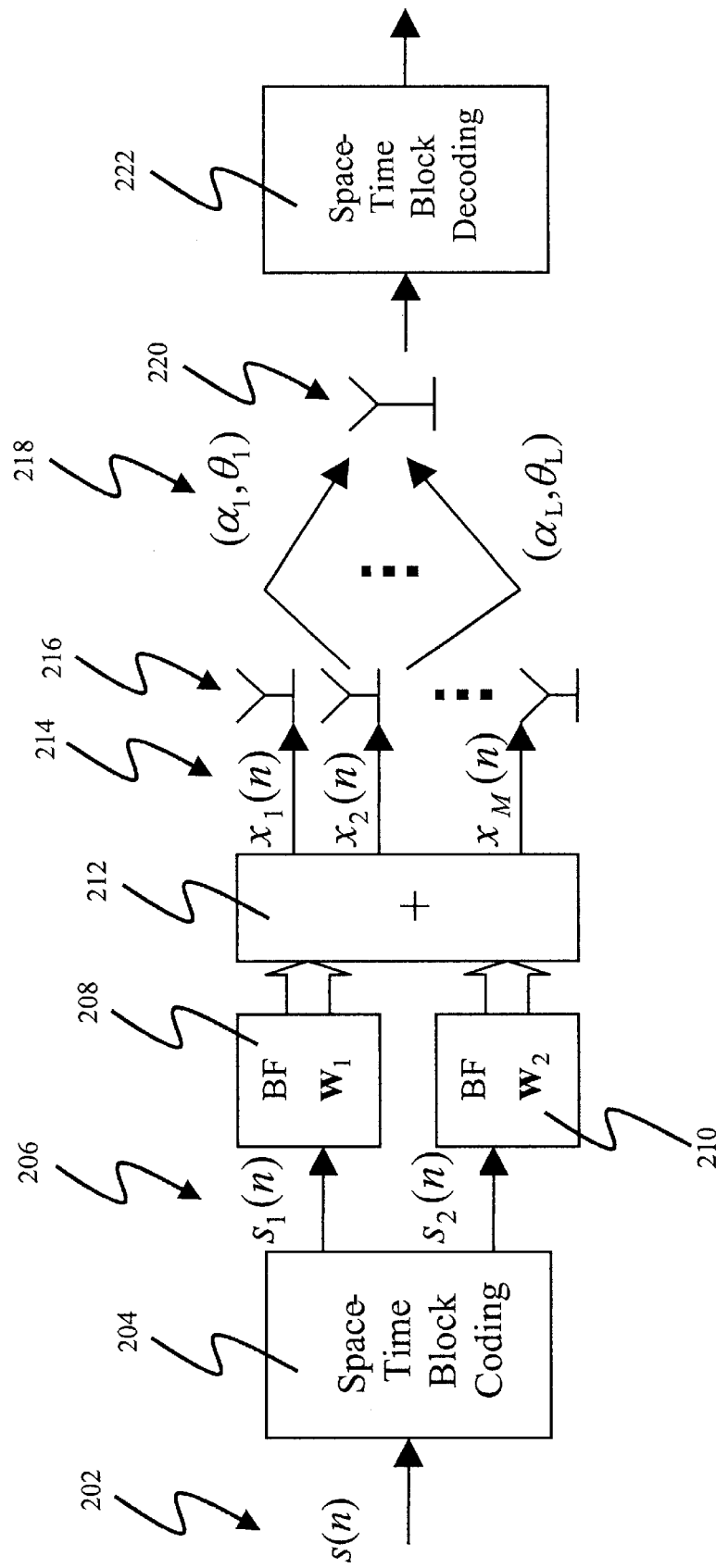
FIG. 2 is a block diagram of a conventional downlink transmission system combining an adaptive antenna system with the STBC technique.

The architecture of the system is similar to the conventional system shown in FIG. 2, with only one important distinction relating to two transmit beamformers $w_1$ 208 and $w_2$ 210. In the system, the beamforming weights used in the beamformers $w_1$ 208 and $w_2$ 210 are computed using processes, methods, and techniques described hereinafter.

Figure 3:
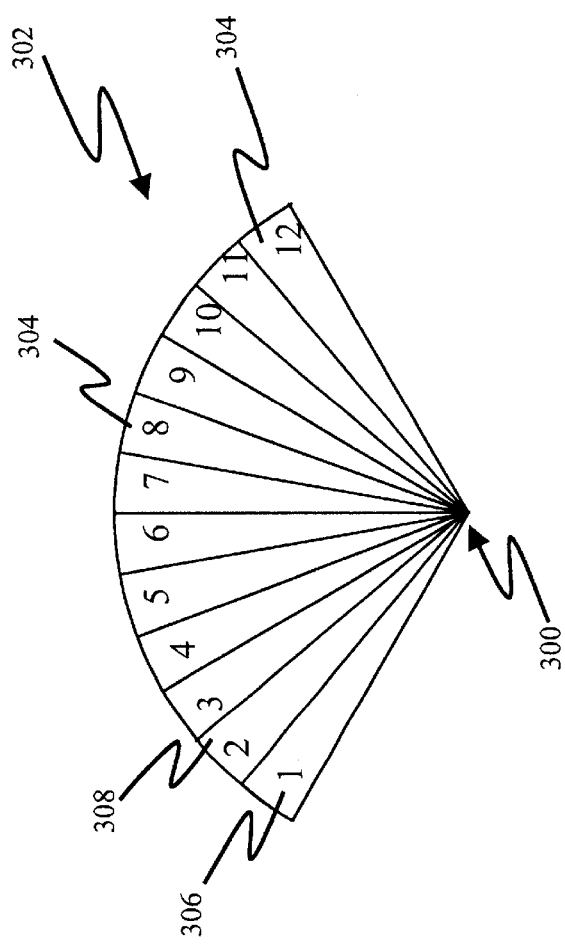
FIG. 3 illustrates a switched beam antenna system with twelve beams per sector.

FIG. 3 illustrates a switched beam antenna system 300 which is used in the system, with twelve beams 302 in each 120° sector, each beam 304 having a 10° width. Beamforming weights $w_i$ for an $i^{th}$ beam (i=1,2, ..., 12) using a ULA antenna may be expressed as:

$$w_i = [w_i(1), w_i(2), \Lambda, w_i(M)]^T \quad (13)$$

where $$w_i(m) = \exp\left[j \cdot (m-1) \cdot 2\pi \cdot \frac{d}{\lambda} \cdot \sin(\varphi_i)\right]$$

(m=1,2, ..., M), $\phi_i$ is the main beam direction of the $i^{th}$ beam, d is the antenna element spacing usually set to 0.5λ, λ is the wavelength of the carrier, and M is the number of antenna elements. Other switched beam antenna systems with different antenna structure and/or beamforming weight generating methods may also be advantageously used.

For conventional uplink or downlink switched beam systems, the objective is to select one best beam at a time for reception or transmission, respectively. A simple and efficient method to achieve this is to calculate the power level at the uplink receiver output in the system for each beam and select the beam with the highest output power for uplink reception or downlink transmission.

Figure 1:
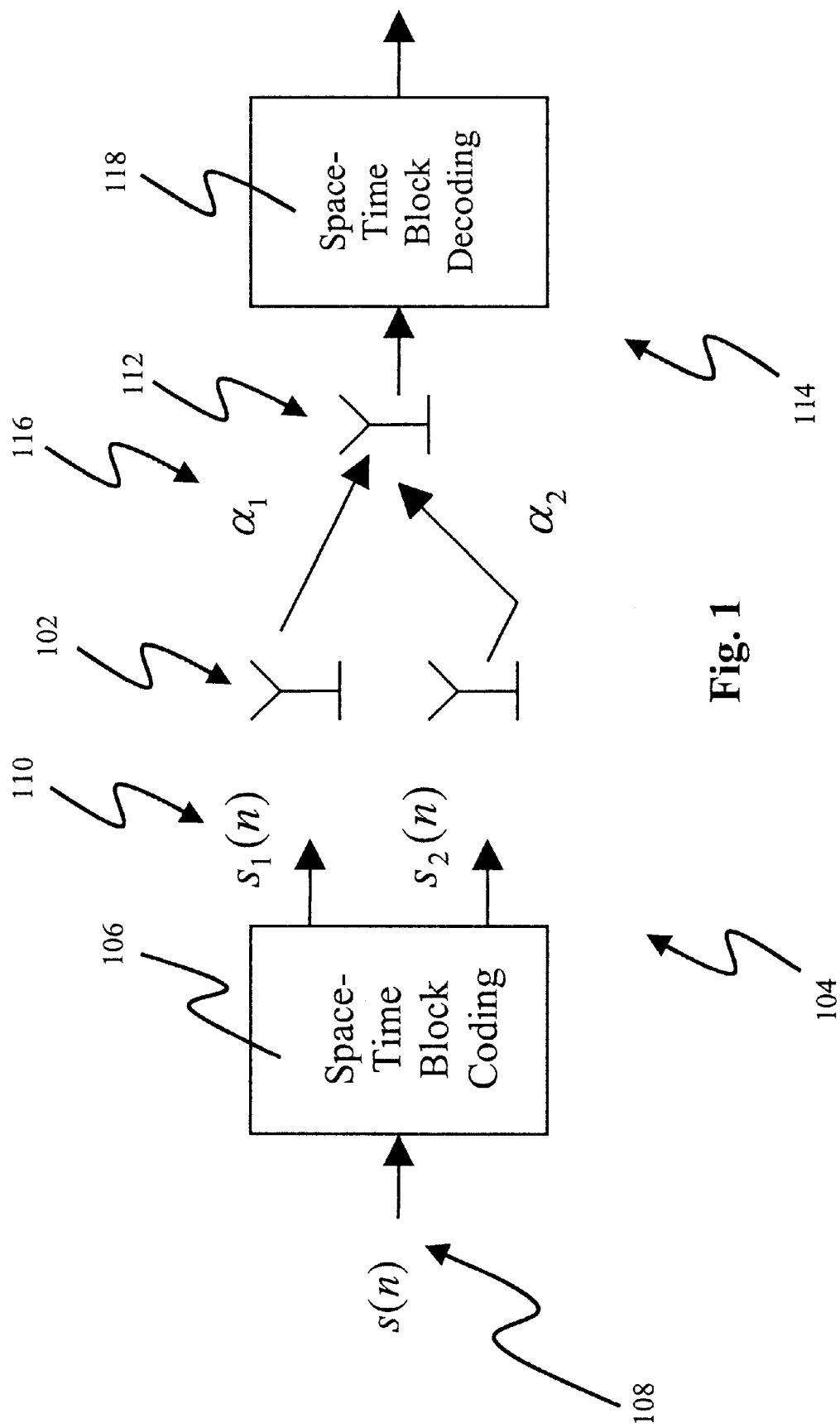
FIG. 1 is a block diagram of a conventional downlink transmission system using the STBC technique.

When the conventional switched beam system is combined with the STBC technique for providing downlink transmission, two beams are needed, and correspondingly two sets of beamforming weights, at a time. As a direct extension from the single strongest beam technique, such a system has to select two strongest beams in terms of receiving power. However, this may cause performance degradation when compared with the adaptive beamforming system combined with STBC using beams determined by cost function from (8) to (10). The inferior performance of the "two strongest" beams technique is mainly due to the non-orthogonality, instead of lower accuracy relating to directivity to the desired mobile terminal, of the two strongest beams as opposed to adaptive beams. The first and second strongest beams are usually either adjacent, for example first and second beams 306 and 308 shown in FIG. 1, or separated by only one beam, thereby providing two highly correlated virtual fading channels, $\beta_1(t)$ and $\beta_2(t)$. As a result, the diversity gain, which is more essential for system performance in a fading environment, is not fully obtained.

To obtain full diversity gain, the system according to an embodiment of the invention therefore has to generate plenty of pairs of orthogonal beams for selection or switching. To approximate the maximum beamforming gain as well, the selected orthogonal beams should always direct to the signal path where most of the signal power lies. The Eigen-decomposition method is preferably applied in the system to produce orthogonal beams and corresponding beamforming weights, because the system not only produces orthogonal beams but also control the directivity of the beams produced. Based on the uplink measurement, two switched beams at directions of most signal power concentrated may be identified using processes, methods, and techniques described hereinafter. Based on the identified switched beams, Eigen-decomposition is applied to generate orthogonal beams while keeping the directivity of the conventional beams. The system generates each pair of orthogonal beams based on two or more switched beams.

For two switched beams i and j (i≠j), the main beam directions are $\phi_i$ and $\phi_j$, respectively. With reference to equation (12), the covariance matrix of the corresponding downlink channels may be appropriately approximated by:

$$\hat{R} = \gamma_i \cdot a(\phi_i) \cdot a^H(\phi_i) + \gamma_j \cdot a(\phi_j) \cdot a^H(\phi_j)] \quad (14)$$

if multipath signals received at the mobile terminal are coming from the directions of beams i and j. The average powers $\gamma_i$ and $\gamma_j$ may be measured at uplink, while for simplicity and minimum compromise in performance, may be set to $\gamma_i = \gamma_j = 0.5$. A pair of orthogonal beams corresponding to switched beams i and j may be found as Eigenvectors of $\hat{R}$ corresponding to two largest Eigenvalues. In this way, a mapping from any two switched beams i and j (i≠j) amongst all possible combination of two switched beams to the corresponding pair of orthogonal beams may be established.

In the case where multipath signals are usually travel through N (N>2) switched beams, the mapping can be established similarly from all N switched beams to corresponding pairs of orthogonal beams. Since this mapping employs Eigen-decomposition is fixed once the communication system is established, the mapping procedure preferably using off-line processing, and therefore does not contribute to the complexity of the system. This is an advantage over adaptive antenna systems in which Eigen-decomposition is applied on-line.

Thus if two conventional switched beams are selected, and the main beams of these two selected switched beams coincide with the directions of the multipath signals, the system uses the corresponding pair of orthogonal beams as transmit beams. Full diversity is then secured by the orthogonality of transmit beams. The maximum beamforming gain is approximated through off-line Eigen-decomposition of $\hat{R}$ in (14), which is an appropriate estimate of R in (12).

Figure 4:
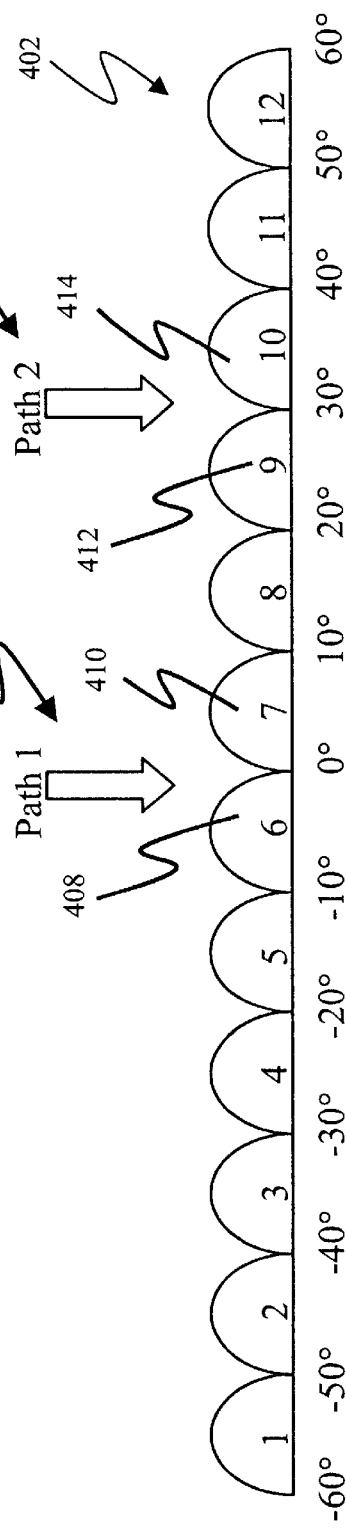
FIG. 4 illustrates the twelve beams shown in FIG. 3 being accentuated to show a twelve-beam pattern.

With reference to FIG. 4, in which the twelve beams shown in FIG. 3 is accentuated to show a twelve-beam pattern 402, a preferred method by which the system captures the two switched beams that cover the directions of incoming multipath signals based on uplink measurements is described. In many scenarios, the selection of the two strongest switched beams works adequately and efficiently. However, the overall performance of the system may be degraded sharply when the directions of multipath signals are at the vicinity of the boundary between two adjacent beams. For example, using uplink measurements, the directions of two incoming paths 404 and 406 with commensurate average power are around 0° and 30°, respectively, of the twelve beam pattern 402. Usually, the two strongest beams for each incoming path are adjacent, and therefore in this case, either the pair comprising sixth 408 and seventh 410 beams or the pair comprising ninth 412 and tenth 414 beams provide the strongest beams. This leads to incorrect selection of switched beams that do not cover all the two incoming paths. To avoid such situations the method also includes an optimal switched beams selection technique described in greater detail hereinafter.

The method provides for the process of selecting the best two beams which ideally cover incoming paths with more power and less correlation with respect to each other. To this end, the method preferably uses a power window threshold 504 of a power window 505 shown in FIG. 5, in which a beam pattern 502 depicts measured powers of the two pairs of beams corresponding to the incoming paths. The power window threshold 504 takes reference from the maximum power measured at the output of each of the beams, in this case the sixth beam 506. All the beams with output power within the employed power window 505 are selected in this process, in this case the sixth 506, seventh 508, ninth 510, and tenth 512 beams. For each beam pair $w_i$ and $w_j$ formed from a combination of selecting two of the four beams in the selected beams pairs, a two-by-two matrix may be formed as:

$$F_{i,j} = W_{i,j}^H \cdot R \cdot W_{i,j} \quad (15)$$

where $W_{i,j}=[w_i\ w_j]$ and R is the downlink channel covariance matrix which may be estimated from uplink measurements. For Time Division Duplex systems (TDD), R is the same as uplink channel covariance matrix and may be obtained using a simple averaging scheme:

$$R = R_u = \frac{1}{N_t}\sum_{n=1}^{N_t} u(n) \cdot u(n)^H \quad (16)$$

where u(n) denotes the uplink array signal sample at the $n^{th}$ instant of time and $N_t$ is the total samples in the sampling time. For Frequency Division Duplex systems (FDD), the downlink channel covariance matrix may be obtained via frequency calibration processing to uplink channel covariance matrix $R_u$ as described in Annex A.

The diagonal elements in $F_{i,j}$ contribute to transmit power of two virtual paths while non-orthogonal elements contribute to the correlation between the two virtual paths. Taking into consideration the maximization of transmit power and minimization of cross correlation, $$\Delta = \det(F_{i,j}) \quad (17)$$

may be used as a cost function to choose the beam pair having the maximum value of Δ among the selected beam pairs. Other cost functions may also be used for choosing the beam pair. And depending on the cost function used, the beam pair may be chosen based on maximum or minimum values of the cost function. For the case illustrated in FIG. 5, the system through the beam selection process selects one from the pair comprising the sixth 506 and seventh 508 beams and another from the pair comprising the ninth 510 and tenth 504 beams.

Figure 5:
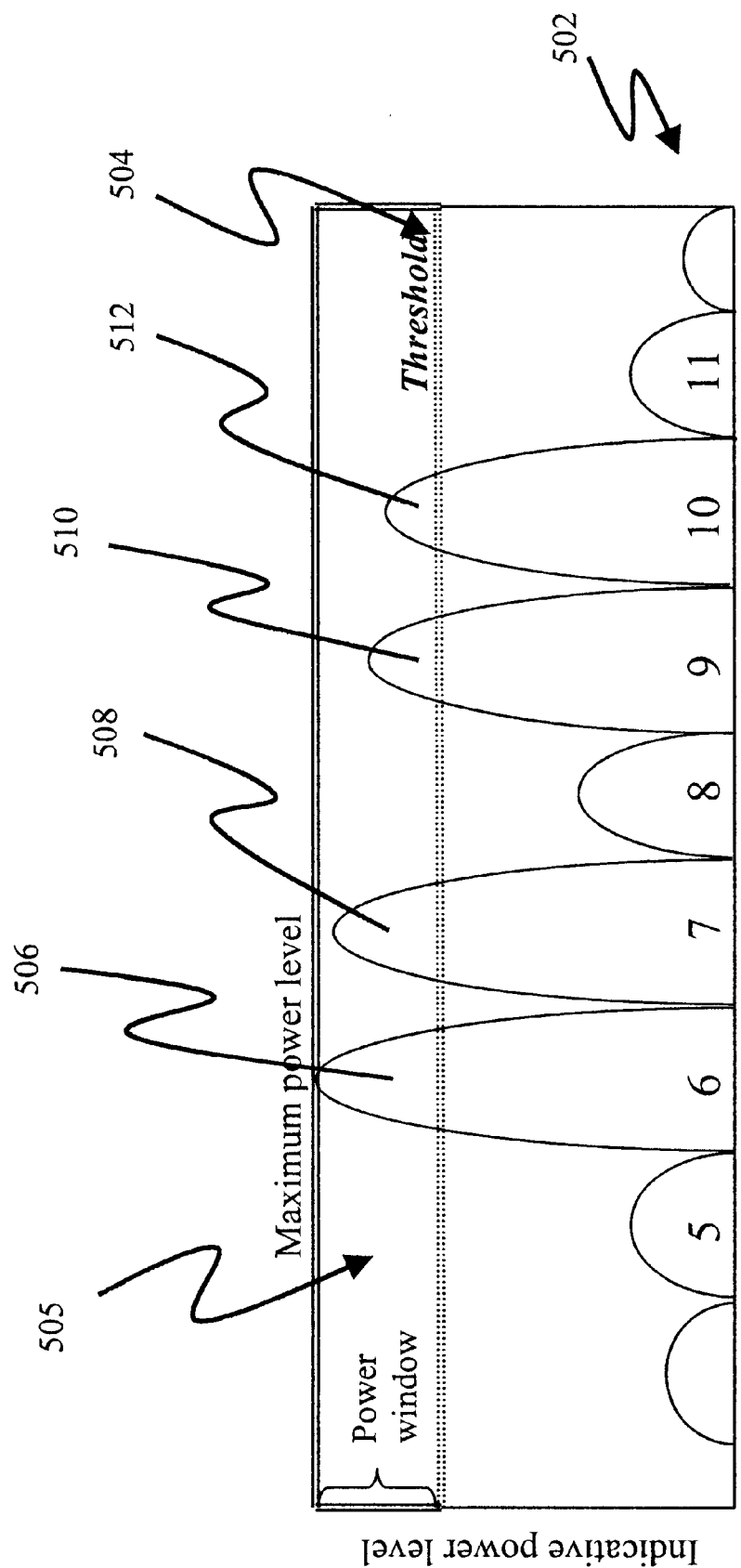
FIG. 5 shows a beam pattern depicting measured powers of two pairs of beams corresponding to incoming paths of a system according to an embodiment of the invention combining the switched beam antenna system of FIG. 3 with the STBC technique.

The beam selection process does not substantially add to the computation load of the system because the power window threshold is preferably selected small enough that there are at most three or four beams selected from the beam pairs for scenarios similar to that illustrated in FIG. 5. In other scenarios, only two beams are typically selected. In the case of the twelve beams illustrated in FIG. 5, the default power window threshold is 3 dB from the upper extremity of the power window. For most of the time, the selection processing works the same as selecting the two strongest beams from the twelve beams. In the cases as illustrated in FIG. 5, four beams at most are selected and the cost function (17) is calculated six times, which is the number of the combination of selecting two from four beams. Also, it is noted that $\det(F_{i,j})=\det(F_{j,i})$.

Figure 6:
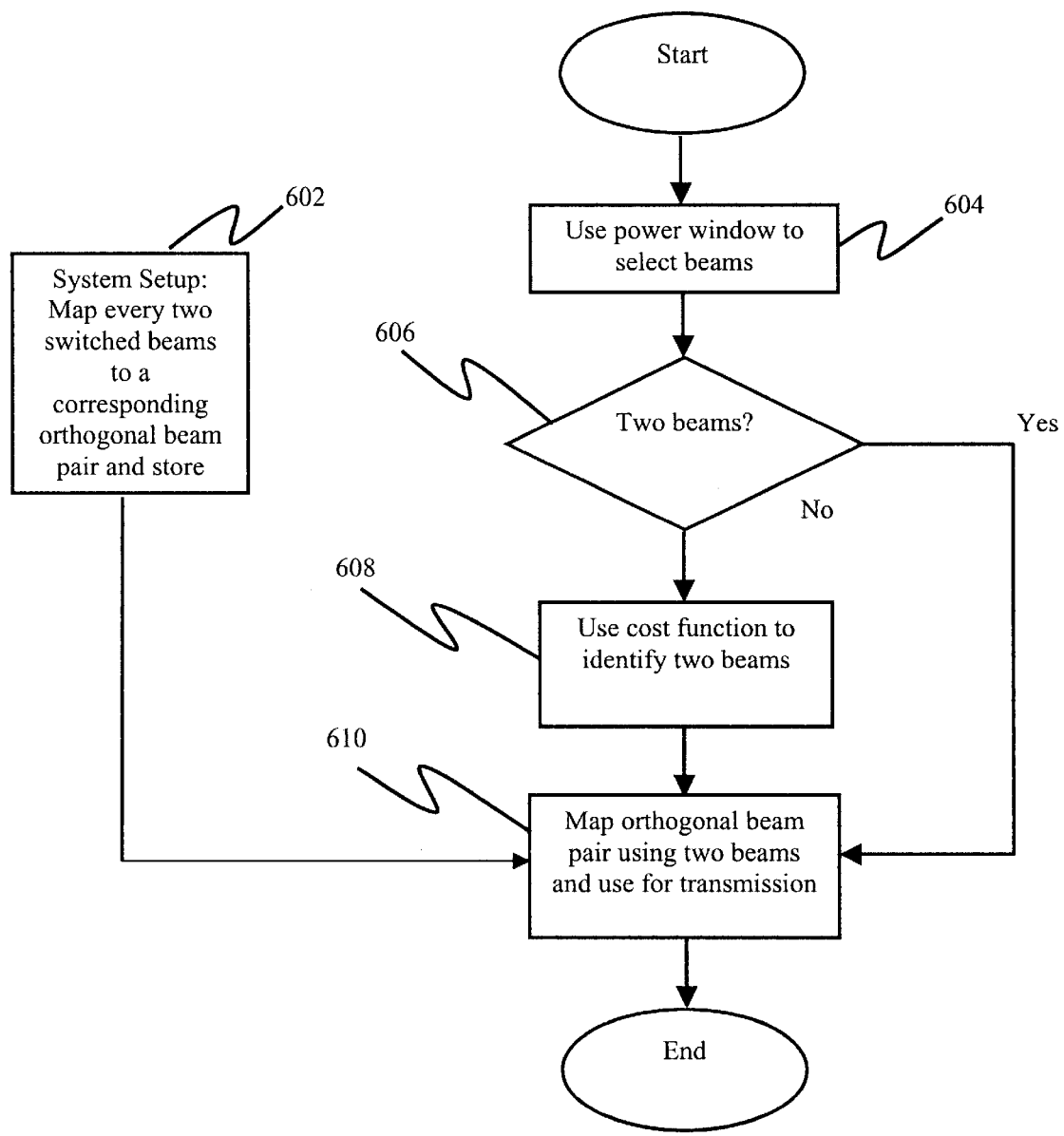
FIG. 6 is a flowchart of operations in a system according to an embodiment of the invention for selecting a pair of switched orthogonal beams using the switched beam antenna system of FIG. 3.

The operation of the system for providing a practical and robust downlink transmission scheme achieving both diversity and beamforming gain through a switched orthogonal beam selection method is summarised using a flowchart shown in FIG. 6.

In a step 602 for setting up the antenna system, a set of mappings from any two switched beams to the corresponding orthogonal beam pair is prepared and stored in the system memory. The orthogonal beams are calculated as Eigenvectors corresponding to two largest Eigenvalues of matrix $\hat{R}$ in (14). This step is performed off-line.

In a step 604, all the beams with output power of uplink within power window threshold are selected. Then in a further step 606, a check for the number of selected beams is performed. If the number of selected beams is two, a next step 608 is skipped and the system proceeds to a step 610.

In the step 608, the cost function in (17) using (15) and (16) is calculated for all combinations of beam pairs among the selected beams. The two beams with a maximum value of the cost function are identified.

The orthogonal beam pair is then mapped from the two identified beams in the step 610 as transmitting beams $w_1$ and $w_2$ using the mapping information stored in the system in the step 602.

There is an alternative and equivalent method to select the two orthogonal switched beam pair when more than two beams are selected with output power within the employed power window 505. Such a method requires the swapping of step 608 and step 610. For each beam pair $w_i$ and $w_j$ formed from a combination of selecting two of the selected beams, the corresponding orthogonal beam pair is found first by the mapping operation. Then the cost function (17) is calculated for all orthogonal beam pairs. The orthogonal beam pair with the maximum value of Δ is selected as transmitting beams $w_1$ and $w_2$.

Although the switched orthogonal beam selection method in the system is derived herein in relation to frequency non-selective fading channels, it is also applicable to frequency selective channels where Code Division Multiplex Access (CDMA) systems or Orthogonal Frequency Division Multiplex (OFDM) systems are employed.

The system performance in terms of bit error rate (BER) is evaluated through simulations described with reference to FIGS. 7a to 7c and 8a to 8c. It is generally assumed that a base station is equipped with 6-element and half-wavelength spaced ULA antenna while a mobile terminal has only single antenna. Twelve switched beams per sector are adopted for both uplink reception and downlink transmission. The communications channel is assumed Rayleigh fading with normalized Doppler shift 0.01 (maximum Doppler shift×sample time interval), and the channel is second order with angular spread set to 10°, 30°, and 60° representing small, moderate, and large angular spreads respectively. To verify performance vs. direction of arrival (DOA), it is generally assumed that the desired mobile terminal moves from one end of the sector to another to cover all the possible DOAs of the sector.

The downlink BER performance vs. DOA and transmit power (SNR) is illustrated in FIGS. 7a to 7c and FIGS. 8a to 8c, respectively. For comparison, performances of three alternative systems are also included. These include a system combining the STBC technique with adaptive beamforming scheme (system A), a system combining the STBC technique with a scheme using two strongest conventional switched beams (system B), and a system combining the STBC technique with a scheme using orthogonal beam pairs corresponding to the two strongest beams (system C). The system described hereinbefore is known as system D.

Figure 7A:
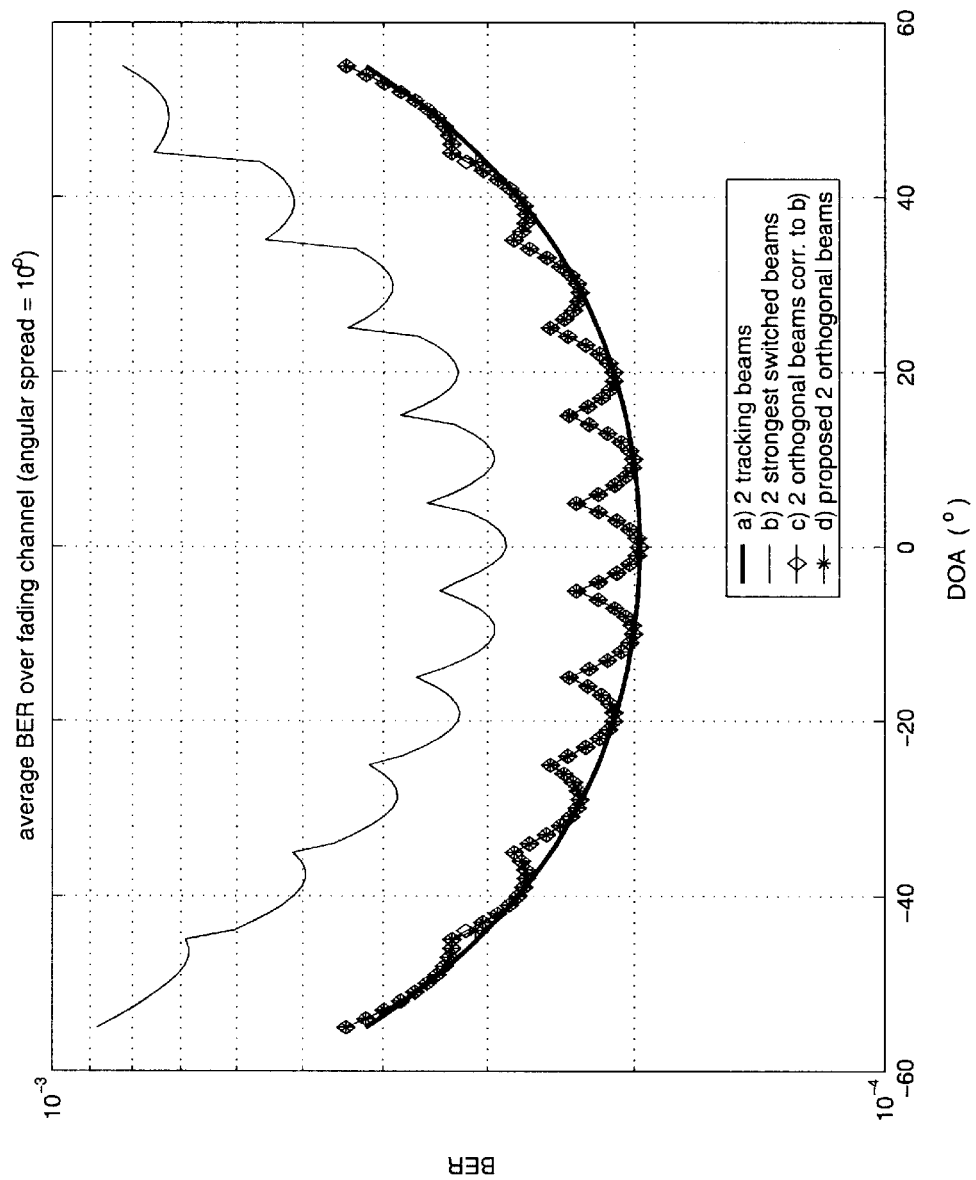
FIGS. 7a to 7c are tabulated simulation results illustrating downlink BER performance vs. DOA for comparing the performance of the system of FIG. 5 with other systems.
Figure 8A:
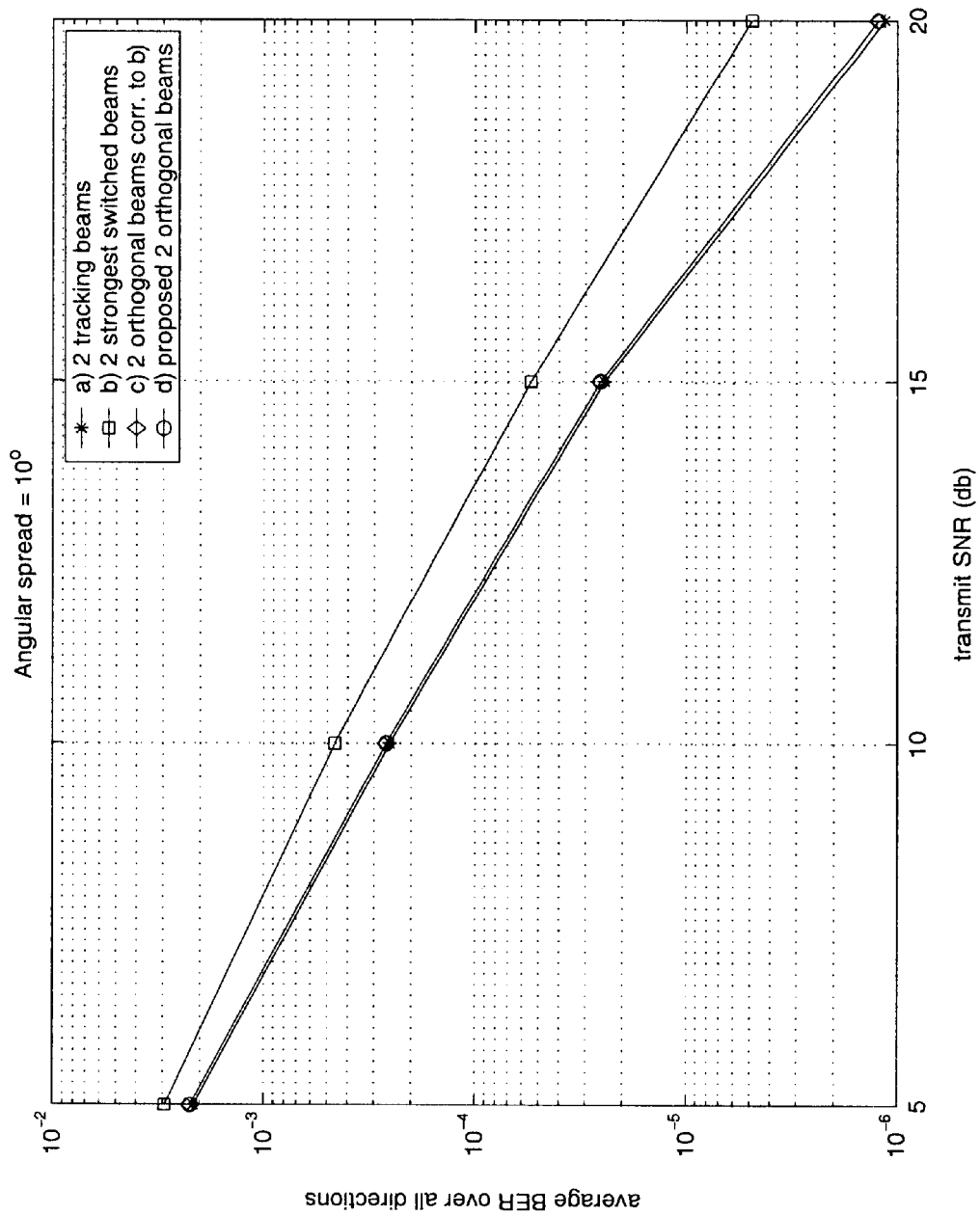
FIGS. 8a to 8c are tabulated simulation results illustrating downlink BER performance vs. transmit power (SNR) for comparing the performance of the system of FIG. 5 with other systems.

For small angular spread case shown in FIGS. 7a and 8a, the system A is outperformed by all three other systems. The advantage in terms of power consumption for the same BER performance is about 1~2.5 dB as shown in FIG. 8a. Because the angular spread is not wider than the width of the switched beams and the scenario shown in FIG. 5 does not occur, the system C works as well as the system D.

Figure 7B:
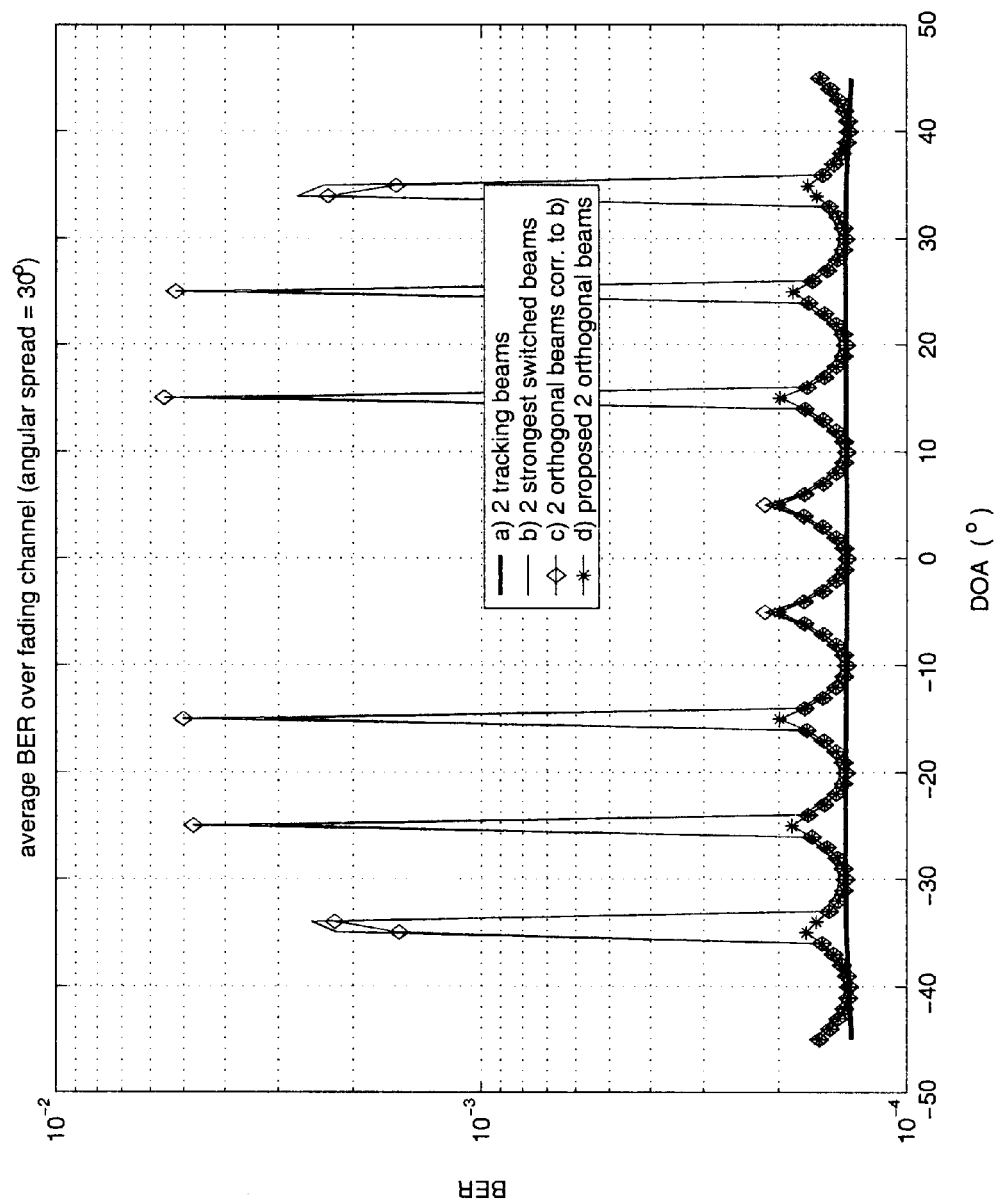
Figure 7C:
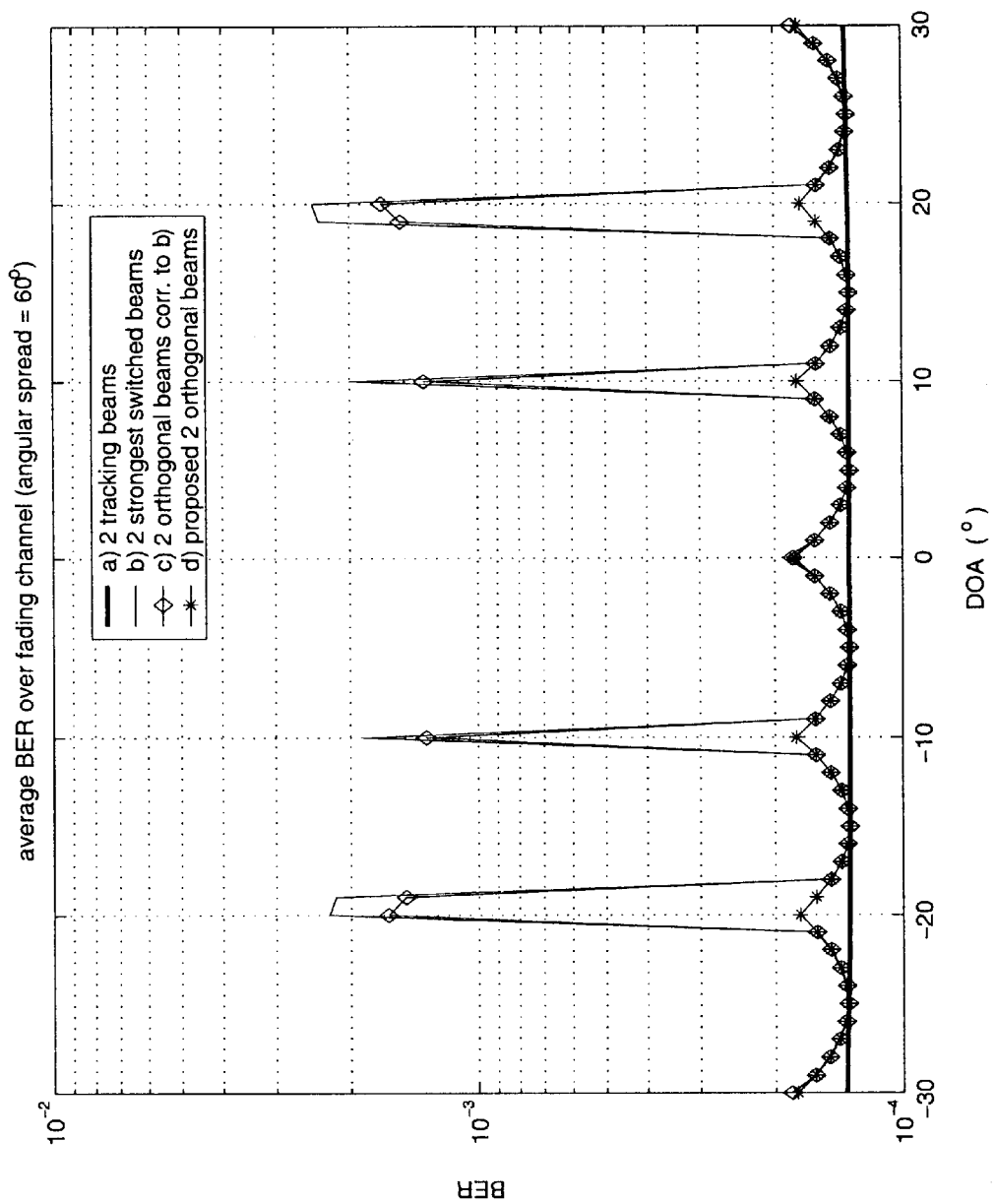
Figure 8B:
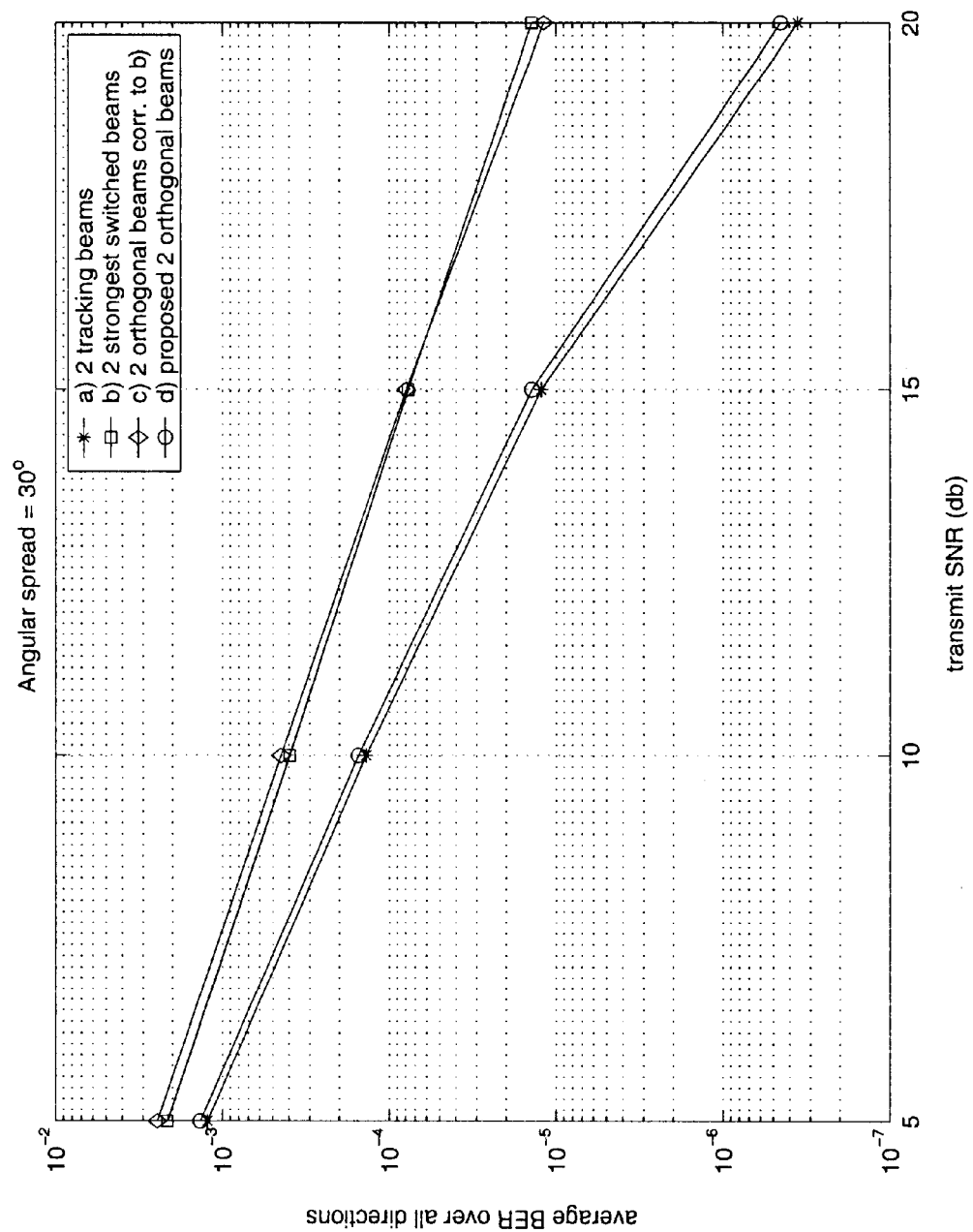
Figure 8C:
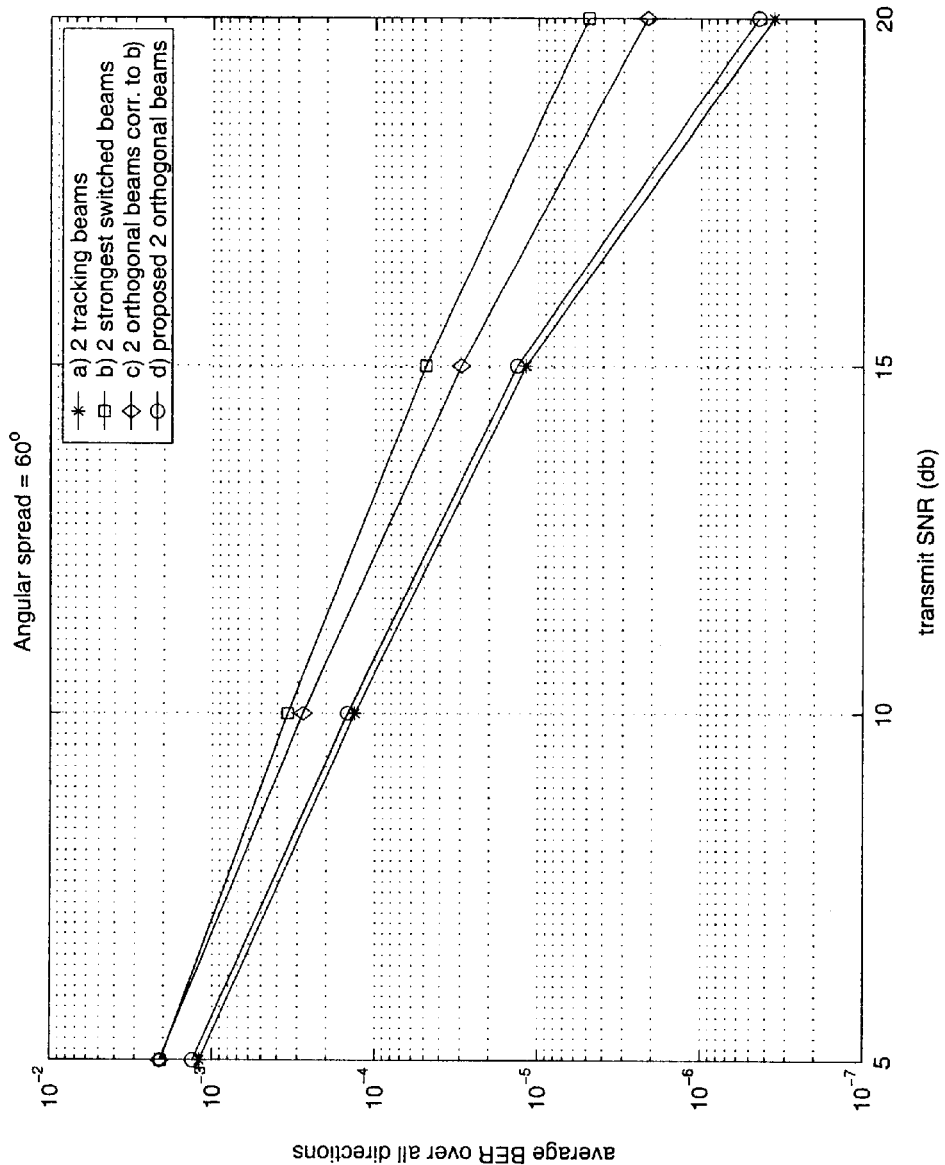

For moderate and large angular spread wider than the width of switched beam, the performance of system C degrades severely especially when the worse scenarios happen as shown in FIGS. 7b and 7c. The performance difference between the systems B or C and the systems A or D may be as large as 5 dB as shown in FIGS. 8b and 8c.

It may therefore be concluded in the simulations that the performance of the system D, and therefore the system according to an embodiment of the invention, always approximates well to the conventional system A for all angular spreads.

In the foregoing manner, a system is described which provides the performance of an adaptive antenna system while possessing the implementation simplicity of a switched beam system for achieving diversity gain and beamforming gain simultaneously.

Although only a number of embodiments of the invention are disclosed, it will be apparent to one skilled in the art in view of this disclosure that numerous changes and/or modification can be made without departing from the scope and spirit of the invention.

For example, the system may approximate the maximum beamforming gain and achieve diversity transmission as well by combining the STTC technique with a switched beam antenna system using the switched orthogonal beam selection method described hereinbefore.

Figure 9:
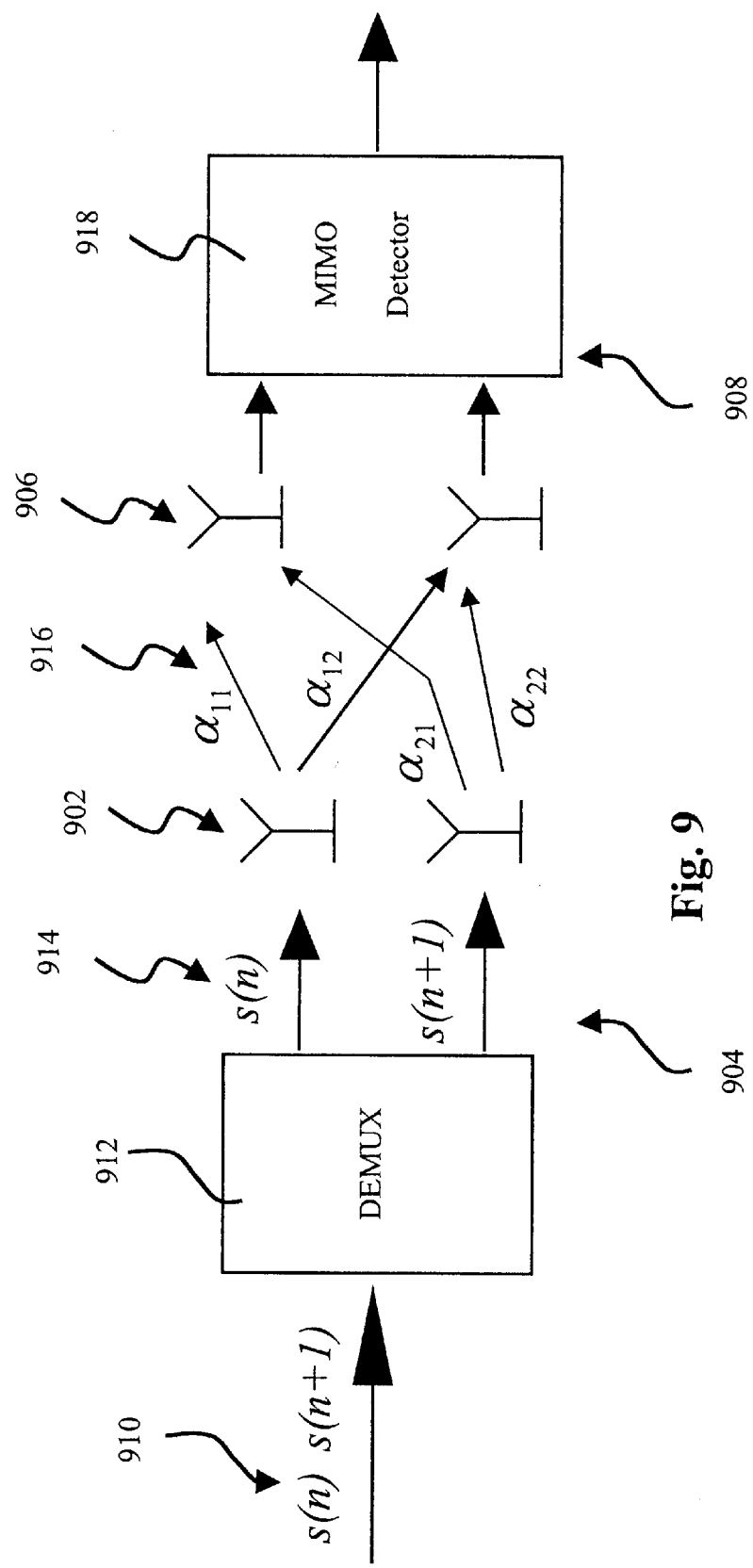
FIG. 9 is a block diagram of a conventional multiple input-multiple output (MIMO) system.

Alternatively, the system may use a Multiple Input Multiple Output (MIMO) wireless communication system in combination with a switched beam antenna system using the switched orthogonal beam selection method for achieving beamforming gain as well as diversity gain. For purposes of briefly describing a conventional MIMO system, a block diagram in FIG. 9 is referenced hereinafter which shows two transmitting antennas 902 in a base station 904 and two receiving antennas 906 in a mobile terminal 908. Such an MIMO system is known as a two input-two output MIMO system in which a serial sequence of original signals s(n), s(n+1) . . . 910 is de-multiplexed by a de-multiplexing module 912 into two parallel signal streams 914, which is then fed directly to the two transmitting antennas 902 for providing diversity transmission but without applying space-time coding as opposed to the other systems employing the STBC or STTC technique. The MIMO system is designed to achieve higher data throughput or transmission data rate and greater spectrum efficiency for wireless communication systems. From the architecture, it is clear that in the MIMO system, the transmission data rate is double compared to a system employing the STBC or STTC technique. At the receiver of the mobile terminal 908, the two receiving antennas 906 providing diversity reception are employed to receive transmitted signals 916 and the outputs of the receiver are passed into a MIMO detector 918, such as V-BLAST detector, to recover the original sequence of the original signals 910. In the case of flat fading channels, there are four channel coefficients in the MIMO system due to two receiving antennas 906 at the receiver of the mobile terminal 908.

In the conventional MIMO system, the number of receiving antennas for providing diversity reception is required to be equal or more than the number of data streams or transmitting antennas for providing diversity transmission. Due to the size, cost, and complexity constraint, the number of receiving antennas in a mobile terminal is usually very small, which for example is two shown in FIG. 9. Therefore the number of transmitting antennas for providing diversity transmission in a base station using the conventional MIMO system is also limited.

However, a switched beam antenna system having a transmitting antenna array with a larger number of transmitting antennas may be combined with the MIMO system to replace conventional transmitting antennas providing diversity transmission in the base station in order to obtain diversity gain as well as beamforming gain. This is akin to the replacement of transmitting antennas providing diversity transmission by a switched beam antenna system in the systems for combining with the STBC or STTC technique described hereinbefore.

Figure 10:
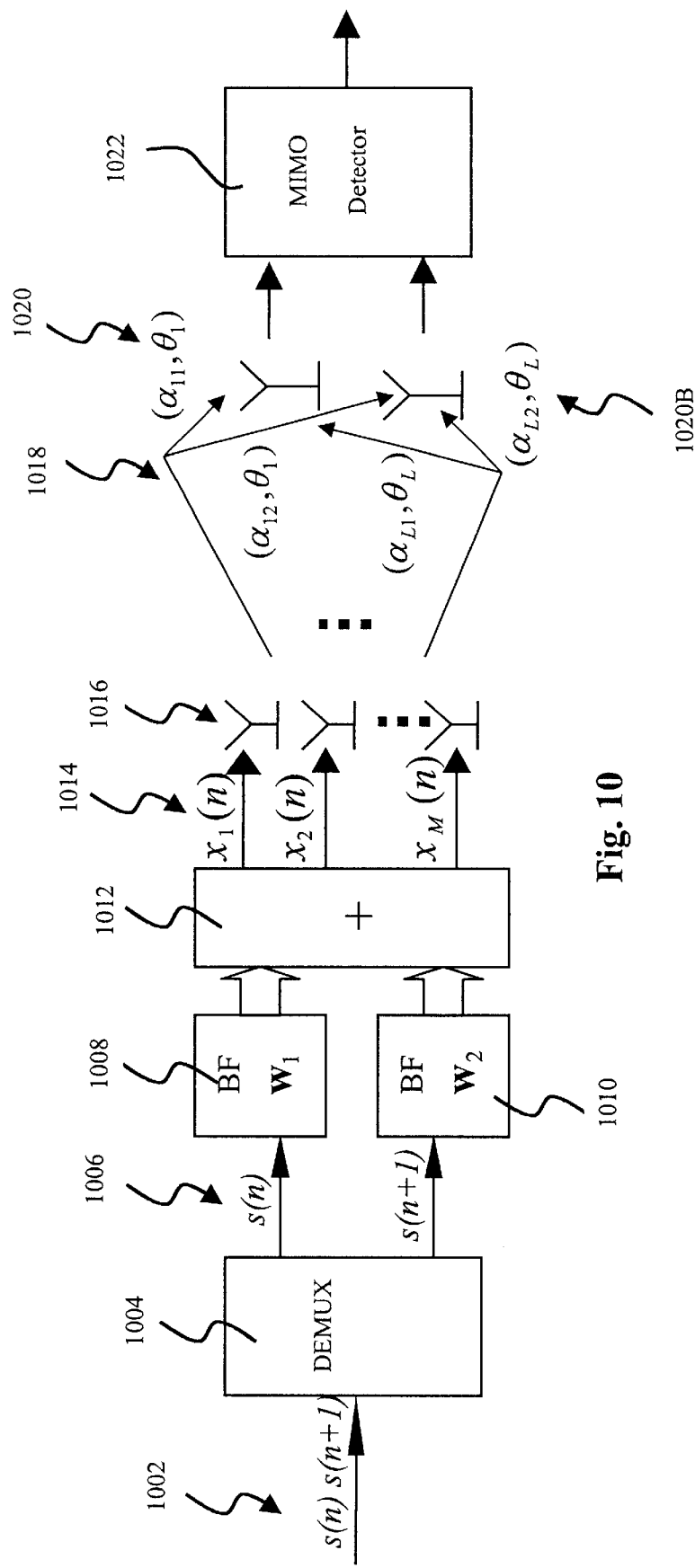
FIG. 10 is a block diagram of another system according to an embodiment of the invention combining the switched beam antenna system of FIG. 3 with the MIMO technique.

A block diagram of the alternative embodiment system combining the MIMO system (equivalent to two input-two output system) with the switched beam antenna system using a beamforming antenna array is shown in FIG. 10. A serial sequence of original signals s(n), s(n+1) . . . 1002 is first de-multiplexed by a de-multiplexing module 1004 into two parallel data streams 1006. The two parallel data streams 1006 are then passed into two transmit beamformers $w_1$ and $w_2$ 1008 for beamforming processing, and passed on to a signal combiner 1012 which performs a simple summing function of the two beamforming processed inputs to produce a signal x(n) 1014 for transmission through multiple antennas 1016.

The physical channel is assumed to consist of L spatially separated paths 1018 with directions of arrival (DOAs) $\theta_l$ and fading coefficients $\alpha_{l1}(t)$ and $\alpha_{l2}(t)$, l=1,Λ,L for receiving antennas 1 (1020A) and 2 (1020B) as shown in FIG. 10. The instantaneous channel response observed by the receiving antennas 1 (1020A) and 2 (1020B) are respectively:

$$h_1(t) = \sum_{l=1}^{L} \alpha_{l1}(t) \cdot a(\theta_l)$$

-continued $$h_2(t) = \sum_{l=1}^{L} \alpha_{l2}(t) \cdot a(\theta_l)$$

The signals coming from each path l=1,Λ,L 1018 arriving at the two receiving antennas 1020A and 1020B experience different fading effects $\alpha_{l1}(t)$ and $\alpha_{l2}(t)$, which are assumed to be uncorrelated for receiving antennas providing diversity reception, although these have the same $\theta_l$. Also, the covariance matrixes for the receiving antennas 1 (1020A) and 2 (1020B) are the same as long as the average power of each path 1018 is the same for the two receiving antennas 1020A and 1020B. The covariance matrixes for the receiving antennas 1020A and 1020B are very similar to the covariance matrix used in the system combining the STBC technique with the switched orthogonal beam selection method described hereinbefore. Therefore, in the system combining the switched beam antenna system and MIMO system, the using the switched orthogonal beam selection method is also applied for achieving fall diversity gain as well as approximated maximum beamforming gain.

Annex A

For Frequency Division Duplex systems (FDD), the downlink channel covariance matrix (DCCM) $R_d$ may be obtained via frequency calibration processing to uplink channel covariance matrix (UCCM) $R_u$ as disclosed in Y-C. Liang and F. Chin, "Downlink beamforming methods for capacity enhancement in wireless communication systems", Singapore Patent Application No. 9904733.4. It is shown that there is deterministic relationship between $R_u$ and $R_d$ based on the fact that the Direction of Arrivals (DOAs) of signals remain unchanged for uplink and downlink transmissions. That is:

$$r_d = C \cdot r_u \quad (A.1)$$

where $$r_u = \text{vec}(R_u) \quad (A.2)$$

$$r_d = \text{vec}(R_d) \quad (A.3)$$

vec( ) is a column-vectorization operator which forms a column vector by aligning columns of the matrix one by one, i.e. for any M-by-N matrix $X=\{x_{ij}\}(i=1 \ldots M, j=1 \ldots N)$, the $((m-1)*M+n)^{th}$ element of the MN-by-1 vector vec(X) is $x_{mn}$, and C is the so called Frequency Calibration (FC) matrix, a function of uplink and downlink carrier frequency, geometry of the antenna array, and cell sectorization. That is to say, given uplink and downlink carrier frequency, geometry of the antenna array, and cell sectorization after setup of the communication system, C is a fixed matrix. It can be calculated off-line as:

$$C = Q_d \cdot (Q_u^H \cdot Q_u)^{-1} \cdot Q_u^H \quad (A.4)$$

where $$Q_u = [\text{vec}(Q_u^{(-M+1)}), \text{vec}(Q_u^{(-M+2)}), \Lambda \text{vec}(Q_u^{(M-1)})]$$

$$Q_d = [\text{vec}(Q_d^{(-M+1)}), \text{vec}(Q_d^{(-M+2)}), \Lambda \text{vec}(Q_d^{(M-1)})]$$

$$Q_u^{(k)} = \int_{-\pi/S}^{\pi/S} a_u(\theta) \cdot a_u^H(\theta) \cdot e^{-j \cdot k \cdot S\theta} d\theta \quad (k = -M+1, -M+2, K, M-1)$$

$$Q_d^{(k)} = \int_{-\pi/S}^{\pi/S} a_d(\theta) \cdot a_d^H(\theta) \cdot e^{-j \cdot k \cdot S\theta} d\theta \quad (k = -M+1, -M+2, K, M-1)$$

$a_u(\theta)$ and $a_d(\theta)$ are the uplink and downlink M-by-1 steering vector at DOA $\theta$ respectively, S is the number of sector, and M is the number of antenna elements. Therefore, with FC matrix C in hand, $r_d$ may be estimated from $R_u$ using formula (A.1) and (A.2) and reconstruct $R_d$ from $r_d$ by inverse procedure of vectorization operation (A.3).

What is claimed is:

1. A method for selecting two beams in a switched beam antenna system for providing downlink communications in a downlink channel, the switched beam antenna system providing uplink reception and downlink transmission, the method comprising the steps of:

selecting a pair of beams based on the uplink reception of the switched beam antenna system;

determining from the pair of beams a corresponding pair of orthogonal beams; and providing the pair of orthogonal beams as a pair of transmit beams for the downlink transmission of the switched beam antenna system.

2. The method as in claim 1, wherein the step of determining the pair of orthogonal beams includes performing Eigen-decomposition on the covariance matrix of the downlink channel.

3. The method as in claim 2, wherein the step of determining the pair of orthogonal beams further includes determining as the pair of orthogonal beams eigenvectors of the covariance matrix of the downlink channel corresponding to two largest Eigenvalues.

4. The method as in claim 3, wherein the step of determining the pair of orthogonal beams further includes determining as the pair of orthogonal beams eigenvectors of the covariance matrix of the downlink channel corresponding to two largest Eigenvalues, wherein the covariance matrix of the downlink channel is approximated by:

$$\hat{R} = \gamma_i \cdot a(\phi_i) \cdot a^H(\phi_i) + \gamma_j \cdot a(\phi_j) \cdot a^H(\phi_j)]$$

which is herein defined.

5. The method as in claim 4, further comprising the step of mapping the pair of orthogonal beams to the pair of beams selected based on the uplink reception of the switched beam antenna system.

6. The method as in claim 1, wherein the step of determining the pair of orthogonal beams is performed prior to the performance of the step of providing the pair of orthogonal beams as the pair of transmit beams for the downlink transmission.

7. The method as in claim 1, wherein the step of selecting the pair of beams includes selecting a pair of beams having power levels exceeding a power threshold.

8. The method as in claim 7, wherein the step of selecting the pair of beams having power levels exceeding the power threshold includes selecting a pair of beams with at least one of maximum and minimum values of a cost function performed on the pair of beams being represented by:

$$F_{i,j} = W_{i,j}^H \cdot R \cdot W_{i,j}$$

which is herein defined.

9. The method as in claim 8, wherein the step of selecting the pair of beams with the maximum value of the cost function includes selecting a pair of beams with the maximum values of a cost function being represented by:

$$\Delta = \det(F_{i,j})$$

which is herein defined.

10. The method as in claim 1, further comprising the step of processing signals transmittable via the pair of transmit beams using at least one of signal processing methods including space-time coding and multiple input-multiple output methods.

11. A switched beam antenna system for selecting two beams for providing downlink communications in a downlink channel wherein the switched beam antenna system provides uplink reception and downlink transmission, comprising:
    means for selecting a pair of beams based on the uplink reception of the switched beam antenna system;
    means for determining from the pair of beams a corresponding pair of orthogonal beams; and
    means for providing the pair of orthogonal beams as a pair of transmit beams for the downlink transmission of the switched beam antenna system.

12. The system as in claim 11, wherein the means for determining the pair of orthogonal beams includes means for performing Eigen-decomposition on the covariance matrix of the downlink channel.

13. The system as in claim 12, wherein the means for determining the pair of orthogonal beams further includes means for determining as the pair of orthogonal beams eigenvectors of the covariance matrix of the downlink channel corresponding to two largest Eigenvalues.

14. The system as in claim 13, wherein the means for determining the pair of orthogonal beams further includes means for determining as the pair of orthogonal beams eigenvectors of the covariance matrix of the downlink channel corresponding to two largest Eigenvalues, wherein the covariance matrix of the downlink channel is approximated by:

$$\hat{R}[\gamma_i \cdot a(\phi_i) \cdot a^H(\phi_i) + \gamma_j \cdot a(\phi_j) \cdot a^H(\phi_j)]$$

which is herein defined.

15. The system as in claim 14, further comprising means for mapping the pair of orthogonal beams to the pair of beams selected based on the uplink reception of the switched beam antenna system.

16. The system as in claim 11, wherein the means for determining the pair of orthogonal beams is actuated prior to the actuation of the means for providing the pair of orthogonal beams as the pair of transmit beams for the downlink transmission.

17. The system as in claim 11, wherein the means for selecting the pair of beams includes means for selecting a pair of beams having power levels exceeding a power threshold.

18. The system as in claim 17, wherein the means for selecting the pair of beams having power levels exceeding the power threshold includes means for selecting a pair of beams with at least one of maximum and minimum values of a cost function performed on the pair of beams being represented by:

$$F_{i,j} = W_{i,j}^H \cdot R \cdot W_{i,j}$$

which is herein defined.

19. The system as in claim 18, wherein the means for selecting the pair of beams with the maximum value of the cost function includes means for selecting a pair of beams with the maximum values of a cost function being represented by:

$$\Delta = \det(F_{i,j})$$

which is herein defined.

20. The system as in claim 11, further comprising means for processing signals transmittable via the pair of transmit beams using at least one of signal processing methods including space-time coding and multiple input-multiple output methods.

* * * * *